United States Patent [19]
Gross

[11] 4,162,372
[45] Jul. 24, 1979

[54] DEVICE FOR ELECTRONICALLY GENERATING THE RADIATION EFFECTS PRODUCED BY A ROTARY LOUDSPEAKER

[75] Inventor: Ulrich Gross, Geldrop, Netherlands

[73] Assignee: U.S. Philips Corporation, New York, N.Y.

[21] Appl. No.: 850,234

[22] Filed: Nov. 10, 1977

[30] Foreign Application Priority Data

Nov. 25, 1976 [DE] Fed. Rep. of Germany ....... 2653454

[51] Int. Cl.[2] ......................... G10H 1/02; H04M 1/00
[52] U.S. Cl. ................................ 179/1 J; 179/1 GP; 84/1.25
[58] Field of Search .......... 84/1.25; 179/1 J, 100 TD, 179/1 GP; 333/29, 30 R

[56] References Cited

U.S. PATENT DOCUMENTS 4,008,641 2/1977 Takada et al. ........................ 179/1 J

*Primary Examiner*—Kathleen H. Claffy
*Assistant Examiner*—E. S. Kemeny
*Attorney, Agent, or Firm*—Thomas A. Briody; William J. Streeter

[57] ABSTRACT

A device for electronically simulating vibrato, chorus, and pseudostereo effects and the radiation effects produced by a rotary loudspeaker with the aid of two loudspeakers or loudspeaker combinations, in which device a controllable amplifier is associated with each loudspeaker, the audio signal being applied to these amplifiers both directly and via a delay means, and both the delay and the gain of the amplifiers being varied synchronously by a subaudio-frequency generator.

6 Claims, 1 Drawing Figure

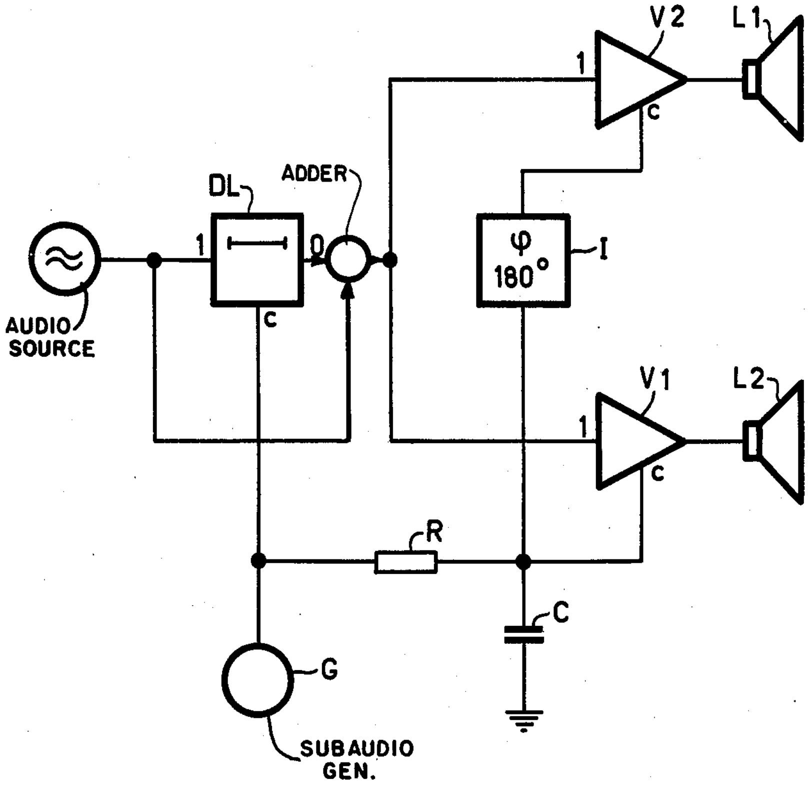
V2
L1
1
c
ADDER
DL
1
0
φ
180°
I
AUDIO
SOURCE
c
V1
L2
1
c
R
C
G
SUBAUDIO
GEN.

DEVICE FOR ELECTRONICALLY GENERATING THE RADIATION EFFECTS PRODUCED BY A ROTARY LOUDSPEAKER

The invention relates to a device for electronically generating the radiation effects produced by a rotary loudspeaker with the aid of a radiator, to which the audio signal is applied both directly and via a delay means with a variable delay which is controlled by a sub-audio frequency generator.

Such a device is known from German Offenlegungsschrift No. 22 61 405. However, this device merely enables the frequency modulation produced by a rotary loudspeaker to be simulated, but the associated amplitude modulation, which is necessarily in synchronism therewith and which is particularly distinct at a rotation frequency of approximately 0.7 Hz for the "chorus" or cathedral effect, is completely absent.

It is an object of the invention to introduce the amplitude modulation into the radiated signal with minimal cost.

According to the invention this is achieved in that two controllable amplifiers are provided, to which the delayed and the undelayed signal are jointly applied, the control input of the one amplifier being connected directly and the control input of the second amplifier via an inverter stage to the output of the subaudio-frequency generator, and the outputs of the two controllable amplifiers each being connected to a loudspeaker or to a loudspeaker combination.

In a further embodiment of a device in accordance with the invention a low-pass filter is included between the subaudio frequency generator and the control inputs of the controllable amplifiers.

Thus, it is achieved that the amplitude modulation at higher modulation frequencies (tremolo) is not as distinct as in the case of the chorus effect.

The invention will now be described in more detail with reference to the drawing.

The audio signal source LF is connected to the inputs 1 of the controllable amplifiers $V_1$ and $V_2$ and to the input 1 of a delay means DL with a variable delay time. The output 0 of said delay means DL is also connected to the inputs 1 of the controllable amplifiers $V_1$ and $V_2$.

A subaudio-frequency generator G is connected to the control input C of the delay means DL and via the low-pass filter, which in the present instance consists of a resistor R and a capacitor C, to the control input of the controllable amplifier $V_1$ and via an inverter stage I, which in the present example takes the form of a 180° phase shifter, to the control input 1 of the controllable amplifier $V_2$. The outputs of the controllable amplifiers $V_1$ and $V_2$ are each connected to a sound radiator, which in the present example consists of one loudspeaker $L_1$ and $L_2$ respectively.

The operation is as follows:

Via the controllable amplifiers $V_1$ and $V_2$ the signals from the audio signal source LF are applied directly to the loudspeakers $L_1$ and $L_2$ respectively, and to the delay means DL. The audio signal arrives at the output 0 after a certain delay and thus also at the inputs 1 of the controllable amplifiers $V_1$ and $V_2$. The delay time is sinusoidally varied by the preferably sinusoidal voltage of the subaudio-frequency generator G, so that the audio signal at the output 0 of the delay means DL is sinusoidally modulated in frequency. In synchronism with this frequency modulation the signal is amplitude modulated in phase opposition in the controllable amplifiers $V_1$ and $V_2$, so that at the output of the amplifiers $V_1$ and $V_2$ an amplitude-modulated undelayed signal and a synchronous frequency and amplitude modulated delayed signal are obtained, and radiated as a sound signal by the loudspeakers $L_1$ and $L_2$.

When the cross-over point of the low-pass filter RC is selected at approximately 1 Hz, the maximum amplitude modulation and change of the apparent location of the sound source are obtained with a modulation frequency of 0.7 Hz, resulting in a very pleasant chorus effect. At the normal tremolo frequency of 6 to 7 Hz the amplitude modulation is less distinct, which in the present example is obtained by means of the low-pass filter.

What is claimed is:

1. A circuit for electronically generating the radiation effects produced by a rotary loudspeaker for use with two loudspeakers, said circuit comprising means for generating a subaudio frequency signal; a variable delay means having signal input means for receiving an audio signal, control input means for receiving said subaudio frequency signal and for varying the delay thereof, and an output means for providing a delayed signal; two amplifiers each having a signal input means for jointly receiving said audio and delayed signals, a gain control input means for receiving said subaudio frequency signal in phase opposition respectively, and an output adapted to be coupled to said loudspeakers respectively; and a phase inverter coupled between said gain control input means.

2. A circuit as claimed in claim 1, further comprising a low-pass filter coupled between the subaudio-frequency generator and one of the gain control inputs of the controllable amplifiers and said phase inverter.

3. A circuit as claimed in claim 2, wherein said filter comprises a resistance-capacitance filter.

4. A circuit as claimed in claim 2, wherein said filter has a one Hertz cut-off frequency.

5. A circuit as claimed in claim 4, wherein said subaudio signal has a 0.7 Hertz frequency.

6. A circuit as claimed in claim 1, wherein said subaudio signal has a 0.7 Hertz frequency.

* * * * *